United States Patent
Itsumi et al.

(10) Patent No.: US 12,079,999 B2
(45) Date of Patent: Sep. 3, 2024

(54) OBJECT TRACKING DEVICE, OBJECT TRACKING METHOD, AND RECORDING MEDIUM

(71) Applicant: NEC Corporation, Tokyo (JP)

(72) Inventors: Hayato Itsumi, Tokyo (JP); Masaharu Morimoto, Tokyo (JP)

(73) Assignee: NEC CORPORATION, Tokyo (JP)

(*) Notice: Subject to any disclaimer, the term of this patent is extended or adjusted under 35 U.S.C. 154(b) by 408 days.

(21) Appl. No.: 17/437,218

(22) PCT Filed: Mar. 10, 2020

(86) PCT No.: PCT/JP2020/010185
§ 371 (c)(1),
(2) Date: Sep. 8, 2021

(87) PCT Pub. No.: WO2020/184539
PCT Pub. Date: Sep. 17, 2020

(65) Prior Publication Data
US 2022/0051413 A1 Feb. 17, 2022

(30) Foreign Application Priority Data
Mar. 13, 2019 (JP) .................... 2019-045641

(51) Int. Cl.
*G06T 7/20* (2017.01)

(52) U.S. Cl.
CPC ...... *G06T 7/20* (2013.01); *G06T 2207/10016* (2013.01); *G06T 2207/30196* (2013.01)

(58) Field of Classification Search
CPC ............ G06T 7/20; G06T 2207/10016; G06T 2207/30196
See application file for complete search history.

(56) References Cited

U.S. PATENT DOCUMENTS

| | | | |
|---|---|---|---|
| 7,921,036 B1 * | 4/2011 | Sharma | G06Q 20/3674 705/52 |
| 2012/0093364 A1 | 4/2012 | Sato | |
| 2015/0077569 A1 | 3/2015 | Ho et al. | |
| 2016/0092739 A1 | 3/2016 | Oami et al. | |
| 2017/0116749 A1 | 4/2017 | Kuroda et al. | |

(Continued)

FOREIGN PATENT DOCUMENTS

| | | | |
|---|---|---|---|
| JP | 2011-170684 A | 9/2011 | |
| JP | 2016-071830 A | 5/2016 | |

(Continued)

OTHER PUBLICATIONS

International Search Report for PCT Application No. PCT/JP2020/010185, mailed on Jun. 16, 2020.

(Continued)

*Primary Examiner* — Shefali D Goradia (57) ABSTRACT

In an object tracking device, an object detection unit detects an object from video data using a plurality of object detection programs of different detection accuracy. The object tracking unit tracks the object from the detected position of the object by the object detection unit. The control unit controls the object detection programs used by the object detection unit based on the detection result of the object by the object detection unit and the tracking result of the object by the object tracking unit.

7 Claims, 10 Drawing Sheets

(56) References Cited

U.S. PATENT DOCUMENTS

| | | |
|---|---|---|
| 2019/0066313 A1 | 2/2019 | Kim et al. |
| 2020/0034630 A1 | 1/2020 | Oami et al. |
| 2021/0089841 A1* | 3/2021 | Mithun .................... G06N 3/04 |
| 2021/0357659 A1 | 11/2021 | Aomi et al. |
| 2022/0375189 A1* | 11/2022 | Beye ...................... G06V 20/00 |

FOREIGN PATENT DOCUMENTS

| | | | |
|---|---|---|---|
| JP | 2017-085564 A | 5/2017 | |
| JP | 2018-026108 A | 2/2018 | |
| WO | WO-2018063243 A1 * | 4/2018 | ............. G06F 3/165 |

OTHER PUBLICATIONS

Alex Bewley et al., "Simple online and real-time tracking", 2016 IEEE International Conference on Image Processing (ICIP), Sep. 2016, pp. 3464-3468.

JP Office Action for JP Application No. 2021-505072, mailed on Sep. 6, 2022 with English Translation.

\* cited by examiner

| | ACCURACY | PROCESSING SPEED |
|---|---|---|
| OBJECT DETECTION PROGRAM 0 | 0.85 | 5 |
| OBJECT DETECTION PROGRAM 1 | 0.7 | 10 |
| OBJECT DETECTION PROGRAM 2 | 0.6 | 20 |

FIG. 6A

| OBJECT ID | LAST DETECTED POSITION ($X_{min}$, $Y_{min}$, $X_{max}$, $Y_{max}$) | NUMBER OF TIMES OF INCOINCIDENCE | PREDICTED POSITION ($X_{min}$, $Y_{min}$, $X_{max}$, $Y_{max}$) |
|---|---|---|---|
| A | 20, 40, 50, 510 | 1 | 32, 56, 60, 523 |
| B | 640, 60, 670, 620 | 0 | 652, 74, 680, 631 |
| C | 15, 20, 35, 490 | 0 | 17, 25, 40, 480 |

OBJECT TRACKING DEVICE, OBJECT TRACKING METHOD, AND RECORDING MEDIUM

This application is a National Stage Entry of PCT/JP2020/010185 filed on Mar. 10, 2020, which claims priority from Japanese Patent Application 2019-045641 filed on Mar. 13, 2019, the contents of all of which are incorporated herein by reference, in their entirety.

TECHNICAL FIELD

The present invention relates to a device for tracking objects included in video data.

BACKGROUND ART

Recently, the recognition accuracy by deep learning has been improved, and the use of IT (Information Technology) resources has been made flexible by cloud computing. As a result, there is an increasing demand for solutions to crime prevention, marketing, and improvement of operations in facilities such as retail stores, stadiums and shopping malls using video analysis systems. One example is to acquire an age, gender and a locus of a customer from video in real-time at retail stores, and to present optimal advertising according to the characteristics of the customer.

On the other hand, it is generally known that video analysis by deep learning has a trade-off relationship between processing speed (number of processed frames per unit time) and accuracy. As the layers of the deep learning are increased, the expressiveness and the accuracy are improved, but the computational cost increases and the processing speed becomes low. On the other hand, as the layers of deep learning are decreased, the accuracy becomes lower, but the calculation cost is reduced and the processing speed is improved. In the above view, there is a problem that the deep learning requires a large number of CPUs (Central Processing Unit) or GPUs (Graphics Processing Unit) in order to obtain high-accuracy analytical results.

There are two methods for tracking objects included in the video. The first method is to calculate the similarity degree from the feature amounts of the objects obtained from the video and to link the objects in the frames of different times as the same object. The second method is to link the objects having a small deviation of object positions in a frame at a certain time t and a time t+1 as the same object. The first method is capable of tracking an object with high accuracy, but the required computational amount is large. The second method lowers the accuracy compared with the first method, but the required computational amount is small.

Patent Document 1 realizes a high-speed object tracking by replacing the tracking of Recurrent Neural Network (RNN) with the comparison of the feature amounts outputted by Convolutional Neural Network (CNN). Non-Patent Document 1 proposes a method for realizing object tracking based on the degree of overlap between the predicted object position and the position of the object outputted by the CNN.

PRECEDING TECHNICAL REFERENCES

Patent Document

Patent Document 1: Japanese Patent Application Laid-Open under No. 2018-026108

Non-Patent Document 1: Alex Bewley and 4 others, "Simple online and real-time tracking", 2016 IEEE International Conference on Image Processing (ICIP), September 2016, pp. 3464-3468

SUMMARY OF INVENTION

Problem to be Solved by the Invention

In order to perform high-accuracy video analysis by deep learning, it is necessary to use a large number of CPUs and GPUs, and it is sometimes difficult to install the equipment which executes the analysis in stores and facilities. When object tracking is performed in real-time by deep learning using a small PC which is easy to install, if a high-accuracy deep learning model is used, the processing speed becomes slow, and the real-time tracking becomes difficult. On the other hand, if a lightweight and low-accuracy deep learning model is used, detection failure increases, and consequently tracking becomes difficult.

It is one object of the present invention to achieve real-time object tracking.

Means for Solving the Problem

According to an example aspect of the present invention, there is provided an object tracking device comprising:

an object detection unit configured to detect an object from video data using a plurality of object detection programs of different detection accuracy;

an object tracking unit configured to track the object from a detected position of the object; and a control unit configured to control the object detection programs used by the object detection unit, based on a detection result of the object by the object detection unit and a tracking result of the object by the object tracking unit.

According to another example aspect of the present invention, there is provided an object tracking method executed by an object tracking device, comprising:

detecting an object from video data using a plurality of object detection programs of different detection accuracy;

tracking the object from a detected position of the object; and controlling the object detection programs used to detect the object, based on a detection result of the object and a tracking result of the object.

According to still another example aspect of the present invention, there is provided a recording medium recording a program, the program causing a computer to function as:

an object detection unit configured to detect an object from video data using a plurality of object detection programs of different detection accuracy;

an object tracking unit configured to track the object from a detected position of the object; and a control unit configured to control the object detection programs used by the object detection unit, based on a detection result of the object by the object detection unit and a tracking result of the object by the object tracking unit.

Effect of the Invention

According to the present invention, real-time object tracking becomes possible.

EXAMPLE EMBODIMENTS

Preferred example embodiments of the present invention will be described with reference to the accompanying drawings.

[Description of Principles]

First, the basic principles of the example embodiments will be described. The object tracking device executes a detection processing of detecting objects in images. Then, the object detection device calculates the predicted position of the object and tracks the object by executing a tracking processing for associating the obtained detection result with the past detection results. Since the detection processing for detecting objects from the images requires high load and it is difficult for small PCs (Personal Computer) to perform analysis with high accuracy in real-time, it is common to use a lightweight detection model of lowered accuracy. However, if the accuracy is lowered, there occurs a state in which the object cannot be detected even though the object actually exists (hereinafter referred to as "undetected"). As a result, the same person may be tracked as a different person, and the tracking accuracy may be lowered.

Figure 1:
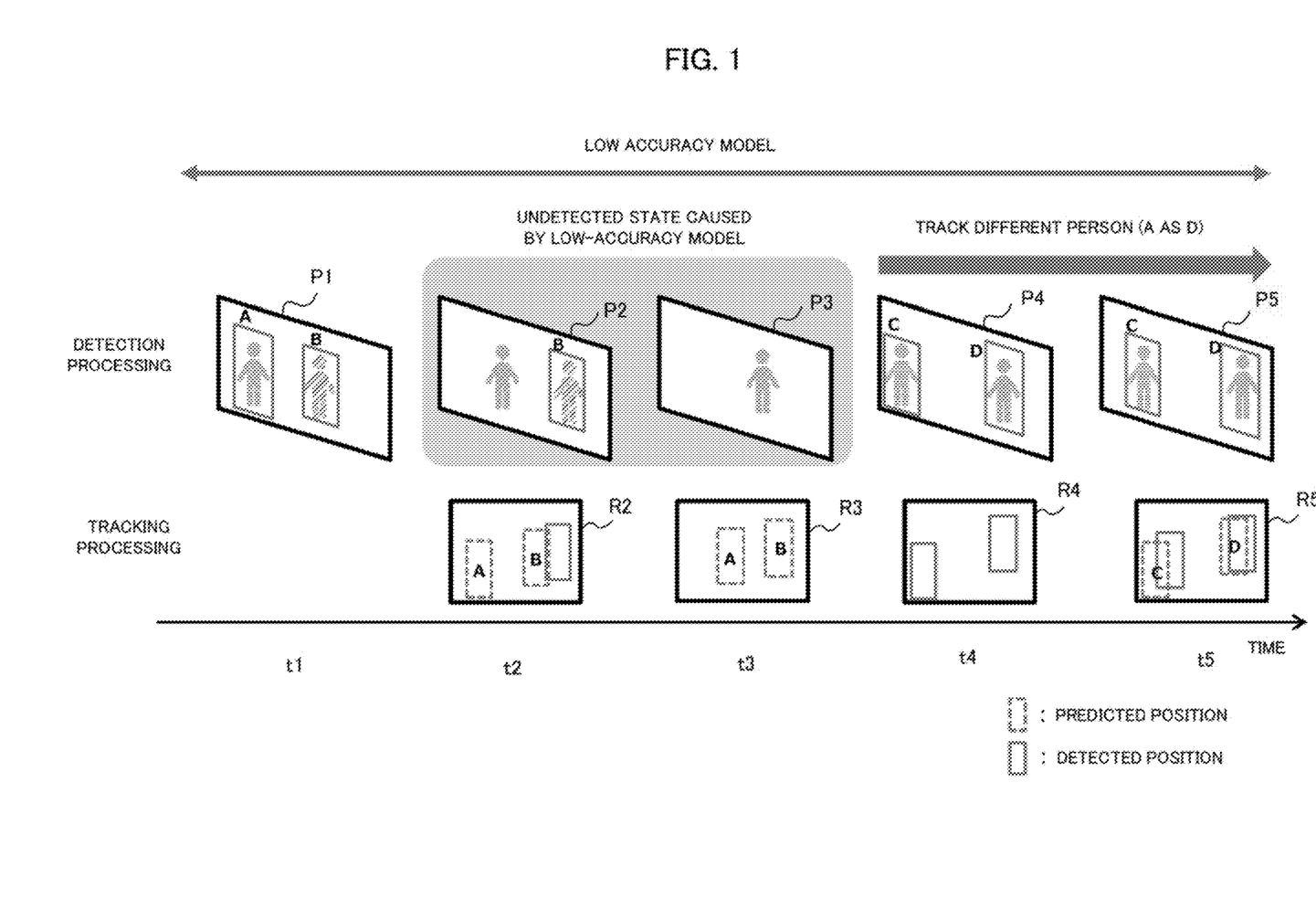
FIG. 1 is an example of object tracking processing by an object tracking device using a small PC.

FIG. 1 shows an example of object tracking processing by an object tracking device using a small PC. Since a small PC is used, a detection model of low accuracy is used for the detection processing of objects. At the time t1, the person A and the person B are detected by the detection processing of the image P1. However, at the time t2, although the person B is detected by the detection processing of the image P2, the person A is undetected. As shown in the image P2, the person A actually exists and is also included in the image P2. However, since the accuracy of the detection model is low, the person A is undetected. As a result, at the time t2, as shown in the tracking result R2, the detected position of the person B (indicated by a solid rectangle) is obtained, but the detected position of the person A is not obtained. It is noted that the predicted positions of the persons A and B at the time t2 (indicated by the broken line rectangles) are generated using the result of the detection processing before the time t1. Further, even at the time t3, although the person A exists as shown in the image P3, the person A is undetected. At the time t3, since the person B is no longer included in the image P3, the person B is not detected. As a result, only the predicted positions of persons A and B are obtained as the tracking result R3 at the time t3.

Thereafter, at the time t4, the persons C and D are detected by the detection processing of the image P4. Here, the person C is a new person, but the person D is actually the person A. Namely, the person A is undetected at the times t2 and t3, and is detected again at the time t4. However, since the person A is undetected at the times t2 and t3, the tracking device determines that the person D detected at the time t4 is a new person who is different from the person A. Thus, the person A who is actually continuously existing in the images is tracked as a different person D after the time t4.

Thus, in a tracking device using a small PC or the like, a person may become undetected because the accuracy of the detection model is low, and the tracking device may mistake the person to be tracked for a different person. Therefore, in the example embodiments, when a person is present in the tracking processing and the predicted position is obtained, but the undetected state of the person continues for a predetermined period of time in the detection processing, a high-accuracy detection model is temporarily used to increase the detection accuracy, thereby preventing the undetected state and improving the accuracy of the object tracking.

Figure 2:
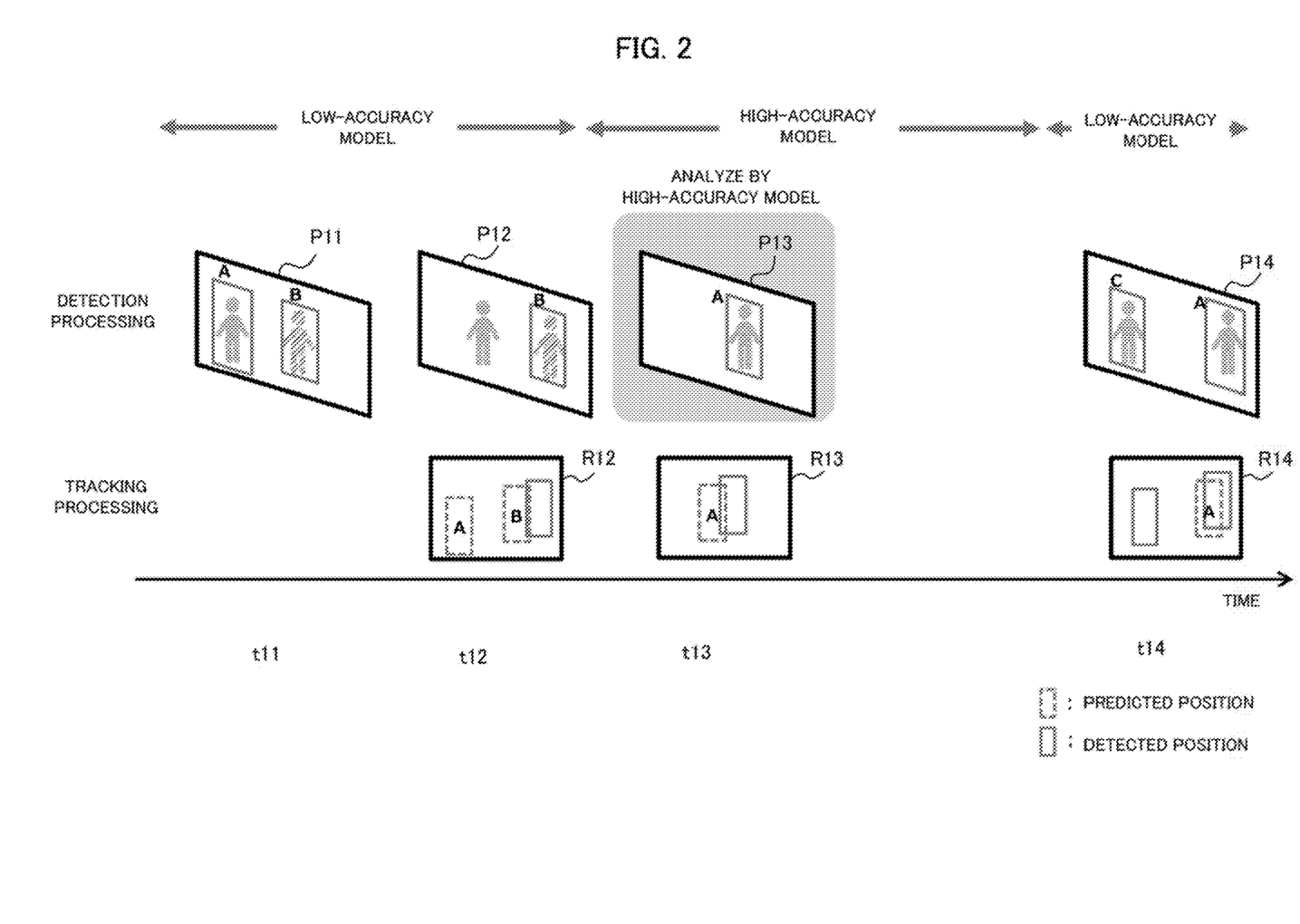
FIG. 2 is an example of the object tracking processing by the object tracking device according to example embodiments.

FIG. 2 shows an example of an object tracking processing by the object tracking device according to the example embodiment. The situations of the times t11 and t12 are the same as the situations of the times t1 and t2 in FIG. 1. Namely, at the time t11, the persons A and B are detected by the detection processing of the image P11. However, at the time t12, only the person B is detected by the detection processing of the image P12, and the person A is undetected. Here, at the time t12, while the tracking processing is succeeded in tracking the person A and the predicted position of the person A (a rectangle with a broken line) is obtained, the detection processing fails to detect the person A. Therefore, the object tracking device increases the accuracy of the detection model at the time t13, and executes the detection processing using a high-accuracy detection model. As a result, at the time t13, the person A is detected in the image P13. Thereafter, the person A is successively detected at the time t14. Namely, unlike the example shown in FIG. 1, the person A is not erroneously determined as a new person D at the time t14. As described above, according to the example embodiments, in a case where an object is present in the tracking process but the object is undetected by the detection processing, a high-accuracy detection model is temporarily applied. This makes it possible to detect the undetected objects and improve the accuracy of the object tracking.

[Hardware Configuration]

Figure 3:
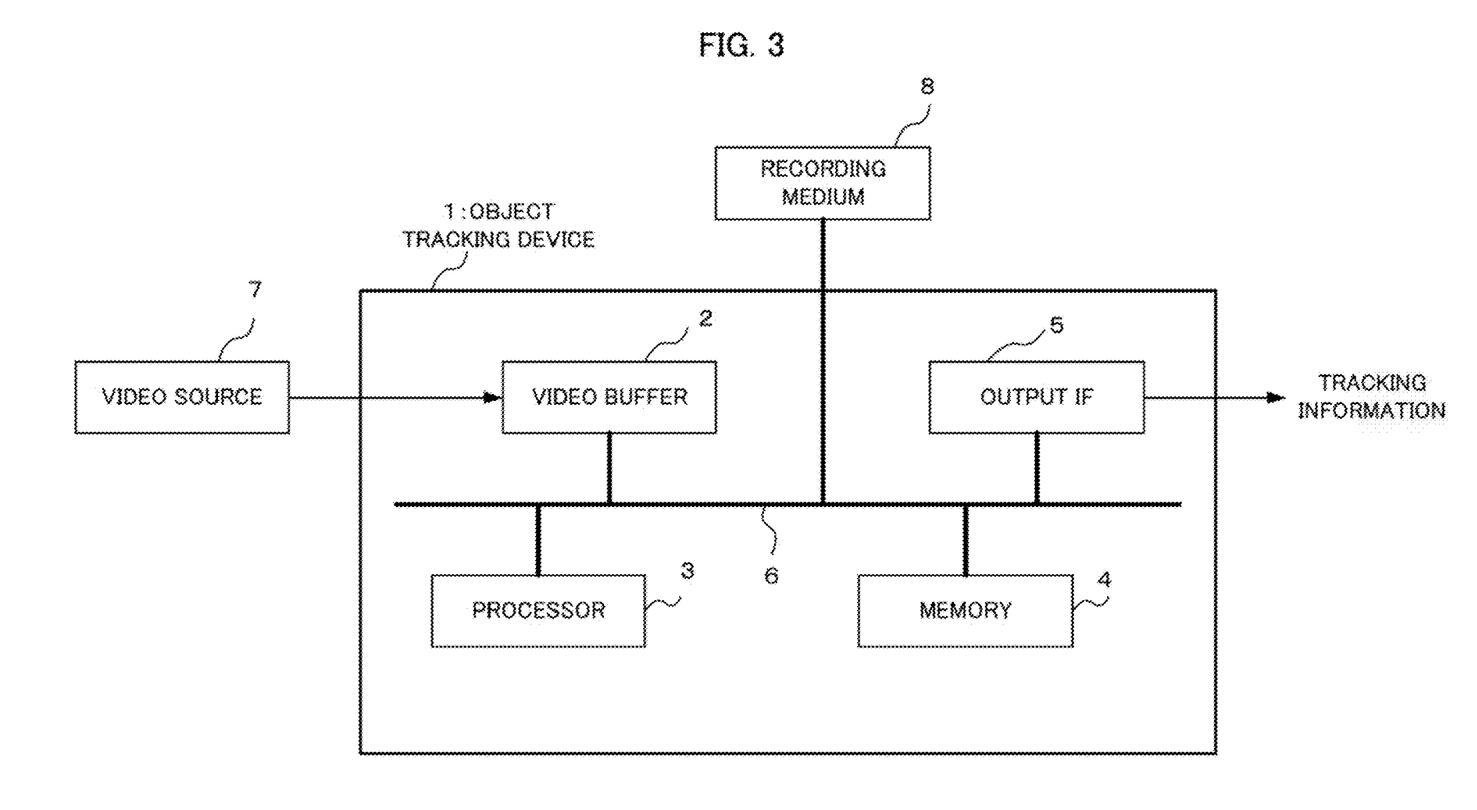
FIG. 3 is a block diagram showing a hardware configuration example of the object tracking device.

Next, a hardware configuration of the object tracking device according to the example embodiments will be described. FIG. 3 is a block diagram illustrating a hardware configuration of the object tracking device 1. The object tracking device 1 is configured using a computer, and includes a video buffer 2, a processor 3, a memory 4, and an output interface (IF) 5. The video buffer 2, the processor 3, the memory 4, and the output IF 5 are connected with each other through a bus 6. Further, a video source 7 and a recording medium 8 are connected to the object tracking device 1.

The video source 7 is a device for providing video data including objects to be tracked. For example, the video source 7 may be an imaging device such as a camera, a database for storing video data captured in advance and the like. The video source 7 supplies time-series video data to the video buffer 2 of the object tracking device 1.

The video buffer 2 temporarily stores the video data supplied from the video source 7. The processor 3 is a CPU, or a CPU and a GPU, and executes the object tracking processing by executing a program prepared in advance. The memory 4 may be a RAM (Random Access Memory), a ROM (Read Only Memory), or the like, and stores a program executed by the processor 3. Also, the memory 4 functions as a work memory during execution of processing by the processor 3. The output IF 5 outputs the tracking information obtained by the object tracking processing to an external device.

The recording medium 8 records a program for executing the object tracking processing. The recording medium 8 is a non-transitory recording medium, such as a non-volatile recording medium, which is readable by a computer. Examples of the recording medium 8 include a magnetic recording device, an optical disk, a magneto-optical recording medium, and a semiconductor memory. The program recorded on the recording medium 8 is read into the memory 4 and executed by the processor 3 at the time of the processing by the object tracking device 1.

First Example Embodiment (Functional Configuration)

Figure 4:
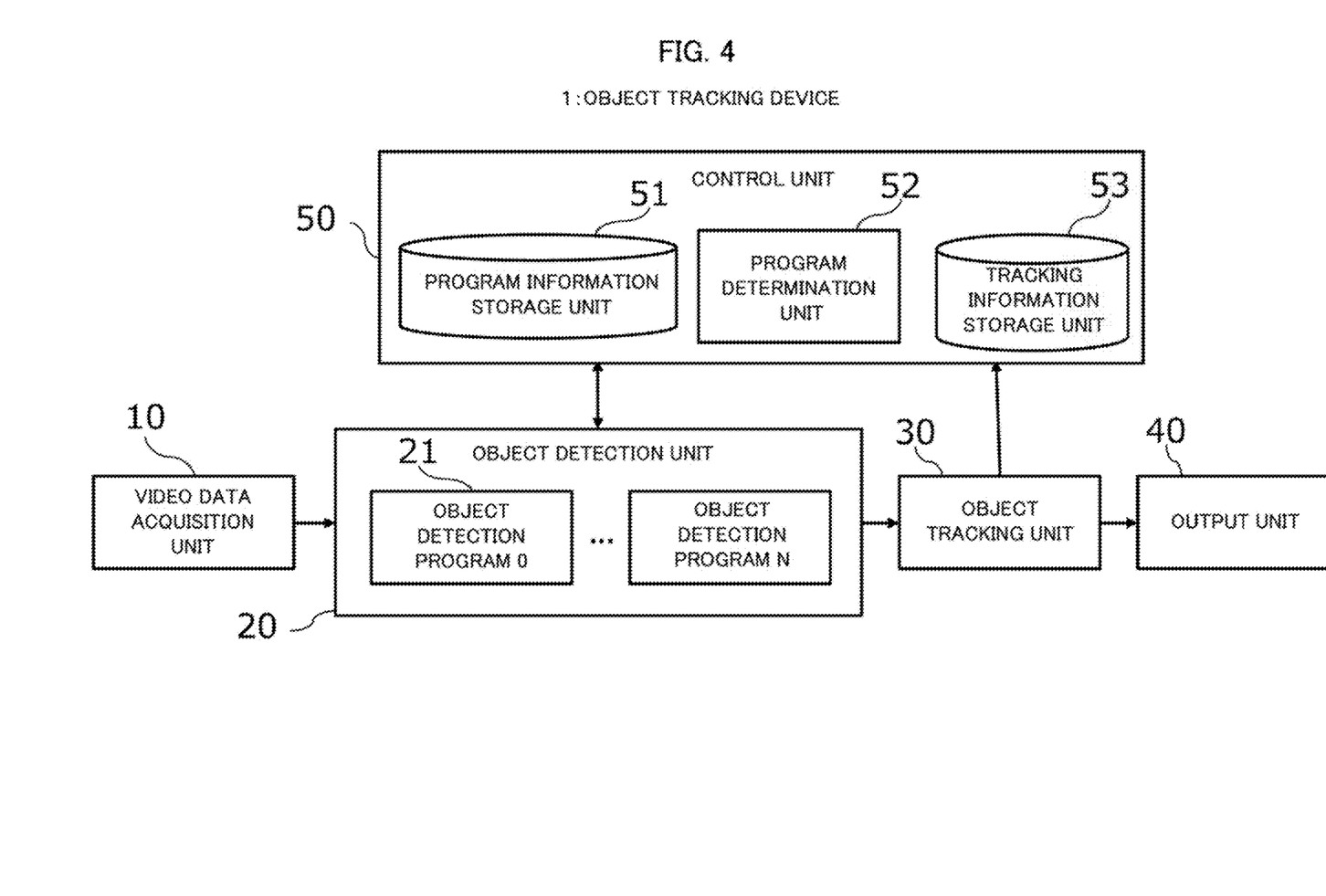
FIG. 4 is a block diagram showing a functional configuration of the object tracking device according to a first example embodiment.

Next, a functional configuration of the object tracking device according to the first example embodiment will be described. FIG. 4 is a block diagram illustrating a functional configuration of the object tracking device 1. The object tracking device 1 includes a video data acquisition unit 10, an object detection unit 20, an object tracking unit 30, an output unit 40, and a control unit 50.

The video data acquisition unit 10 corresponds to the video buffer 2 in FIG. 3. The video data acquisition unit 10 acquires video data from the video source 7, and supplies it to the object detection unit 20. The video data includes a plurality of frame images arranged in time series.

The object detection unit 20 stores a plurality of object detecting programs 21. The object detection program 21 is a program for detecting an object to be tracked from the video data. Here, the plurality of object detection programs 0 to N are different in detection accuracy, and usually their processing speeds are also different accordingly. Basically, the object detection program 21 of high detection accuracy is slow in the processing speed, and the object detection program 21 of low detection accuracy is fast in the processing speed. The object detection unit 20 detects objects from the video data using one of the plurality of object detection programs 21 at each detection timing. The program used by the object detection unit 20 for detecting the objects is determined by the control unit 50. The object detection unit 20 supplies the detected positions of the objects, i.e., the positions of the objects in the video data to the object tracking unit 30. The detected position of the object is indicated by the position coordinates in the frame image at a certain time, for example, as indicated by a solid rectangle in FIG. 2.

The object tracking unit 30 tracks the object based on the detected positions of the objects. Specifically, the object tracking unit 30 calculates the predicted position of the object based on the past detected positions of the object. The predicted position of the object is the position at which the object is predicted to be present at that time. The predicted position of the object is indicated by the position coordinates in the frame image at a certain time, for example, as indicated by the broken line rectangle in FIG. 2. The object tracking unit 30 supplies tracking information including the calculated predicted position of the object to the control unit 50 and the output unit 40.

The output unit 40 corresponds to the output IF 5 in FIG. 3, and outputs the tracking information supplied from the object tracking unit 30 to an external device. The external device is, for example, a device including a display unit. The external device displays the rectangles indicating the detected position and the predicted position of the object superimposed on the frame image at each time of the video data, and presents the tracking result to the user. Further, the external device may calculate and display the movement locus of the object using the predicted positions of the object, and the position and the capturing range of the camera that captured the video data.

Figure 5:
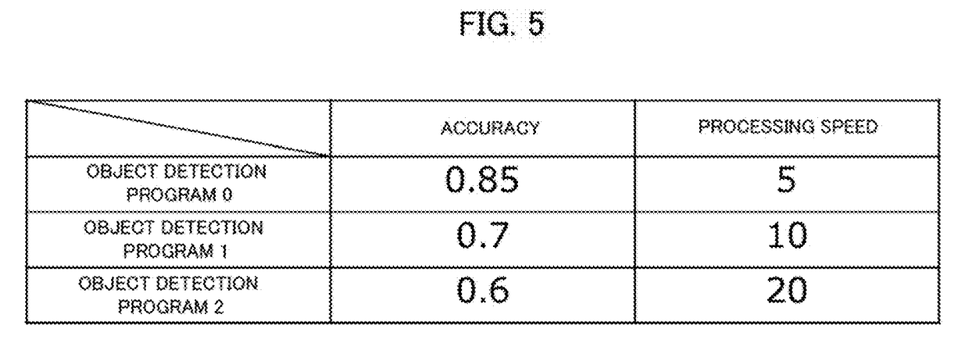
FIG. 5 illustrates an example of program information.

The control unit 50 includes a program information storage unit 51, a program determination unit 52, and a tracking information storage unit 53. The program information storage unit 51 stores program information. The program information is information indicating characteristics of the plurality of object detection programs used by the object detection unit 20. FIG. 5 shows an example of the program information. The program information includes "accuracy" and "processing speed" of each object detection program. Here, the "accuracy" is the accuracy of detecting objects, and the higher the numerical value is, the higher the accuracy is. The "processing speed" is the speed of processing to detect objects, and the higher the number is, the faster the speed is. In the example of FIG. 5, the object detection program 0 has the highest accuracy and the lowest processing speed. On the other hand, the object detection program 2 has the lowest accuracy and the highest processing speed.

Figure 6A:
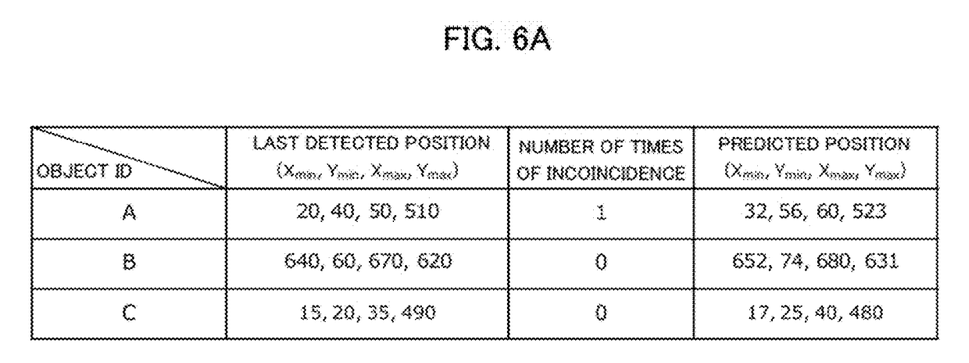
FIGS. 6A and 6B illustrate an example of tracking information.
Figure 6B:
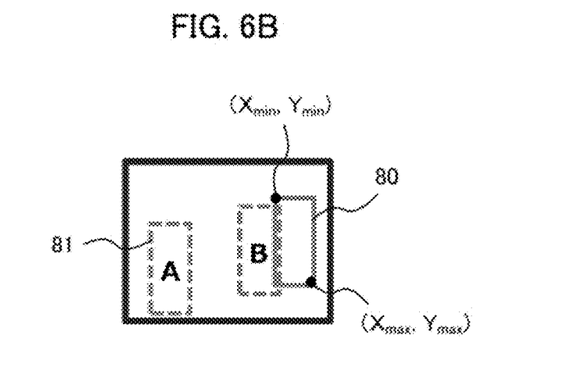

The tracking information storage unit 53 temporarily stores the tracking information supplied from the object tracking unit 30. FIG. 6A shows an example of the tracking information. The tracking information is a list of the objects that are currently being tracked. Specifically, the tracking information indicates the "last detected position", the "number of times of incoincidence" and the "predicted position" for each object ID to be tracked. The "last detected position" is the position where each object is detected by the object detection unit 20 in the last detection processing. The detected position of the object is indicated by the coordinates in the frame image used in the detection processing. Specifically, as shown in FIG. 6B, the range in which the object is present in the frame image is indicated by a rectangular area 80 (solid line), and the coordinates of the upper left and lower right points of the rectangular area 80 are used as the detected position. The "predicted position" indicates the predicted position of the object calculated by the object tracking unit 30 based on the last detected position. As shown in FIG. 6B, the predicted position is also indicated by a rectangular area 81 (broken line) in which the object is predicted to be present, and the coordinates of the upper left and lower right points of the rectangular area 81 are used as the predicted position. It is noted that the above method is merely an example, and the method of defining the detected position and the predicted position of the object by coordinates is not limited to the above example. For example, when the position of an object is indicated by a circular area, the position of the object may be indicated by the center coordinates and the radius of the circular area.

The "number of times of incoincidence" indicates the number of times that the result of the coincidence determination by the object tracking unit 30 becomes incoincident. The object tracking unit 30 compares the current detected position of the object with the predicted position of the object for each object, and determines that the detected position and the predicted position are "coincident" when both positions are within a predetermined allowable deviation range. If the detected position and the predicted position are coincident, the object tracking unit 30 is successfully tracking the object. On the other hand, when the detected position and the predicted position are not within the predetermined allowable deviation range, the object tracking unit 30 determines that the detected position and the predicted position are "incoincident". If the detected position and the predicted position are incoincident, the object tracking unit 30 has failed to track the object. The "number of times of incoincidence" indicates the number of times that the detected position and the predicted position of the object are determined to be "incoincident" by the object tracking unit 30. When the number of times of incoincidence reaches or exceeds a preset threshold value, the object tracking unit 30 determines that the object has disappeared from the video data and deletes the object from the tracking information.

The program determination unit 52 executes a processing (hereinafter, referred to as a "program determination processing") for determining one object detection program to be used by the object detection unit 20 from a plurality of object detection programs prepared in advance, using the program information stored in the program information storage unit 51 and the tracking information stored in the tracking information storage unit 53. Details of the program determination processing will be described later. The program determination unit 52 instructs the object detection unit 20 to use the determined object detection program. The object detection unit 20 executes the object detection processing using the object detection program instructed by the program determination unit 52.

(Object Tracking Processing)

Figure 7:
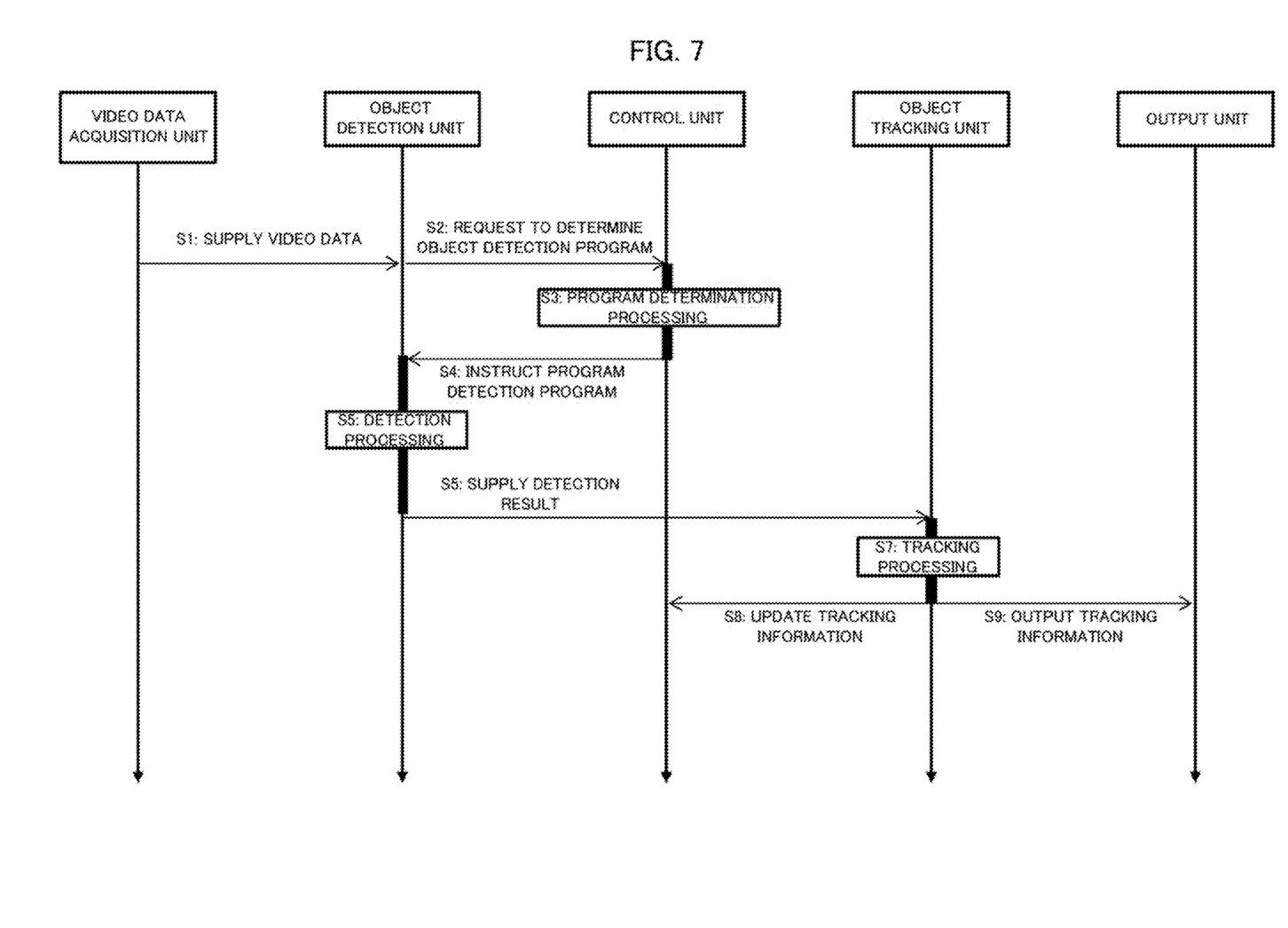
FIG. 7 illustrates a sequence of the object tracking processing.

Next, the object tracking processing executed by the object tracking device 1 will be described. FIG. 7 shows a sequence of the object tracking processing. The processing shown in FIG. 7 is realized by the processor shown in FIG. 3, which executes a program prepared in advance.

First, the video data acquisition unit 10 acquires the video data from the video source 7, and supplies it to the object detection unit 20 (step S1). The object detection unit 20 requests the control unit 50 to determine the object detection program (step S2). In response to the request from the object detection unit 20, the control unit 50 executes the program determination processing to determine the object detection program to be used by the object detection unit 20 (step S3). The control unit 50 determines the object detection program using the program information stored in the program information storage unit 51 and the tracking information stored in the tracking information storage unit 53, the details of which will be described later. When the program determination processing is completed, the control unit 50 instructs the object detection unit 20 to use the determined object detection program (step S4).

The object detection unit 20 executes the detection processing of the object using the object detection program instructed by the control unit 50 (step S5). Specifically, the object detection unit 20 analyzes each frame image of the video data supplied in step S1 and detects the objects. Then, the object detection unit 20 supplies the detection result indicating the detected positions of the objects to the object tracking unit 30 (step S6).

The object tracking unit 30 executes the tracking processing using the detection result supplied from the object detection unit 20 (step S7). Specifically, the object tracking unit 30 calculates the predicted position of the object using the detected position of the object acquired in the past. Next, the object tracking unit 30 compares the calculated predicted position with the detected position of the object acquired this time, and determines whether or not those two coincide. When the predicted position and the detected position coincide, the object tracking unit 30 determines that the object is being tracked, and updates the predicted position using the detected position at this time. On the other hand, when the predicted position and the detected position do not coincide, the object tracking unit 30 increases the number of times of incoincidence by one. Further, when the number of times of incoincidence exceeds a predetermined threshold value, the object tracking unit 30 excludes the object from the tracking targets. Then, the object tracking unit 30 supplies the tracking information obtained by the tracking processing to the control unit 50, and updates the tracking information in the tracking information storage unit 53 (step S8). Further, the object tracking unit 30 outputs the tracking information to the external device (step S9).

(Program Determination Processing)

Next, the program determination processing executed in step S3 will be described.

(1) 1st Example

Figure 8:
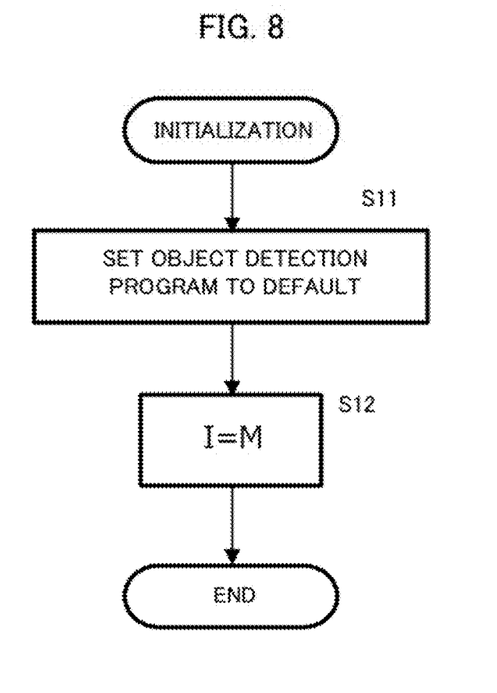
FIG. 8 is a flowchart of initialization processing of program determination processing.
Figure 9:
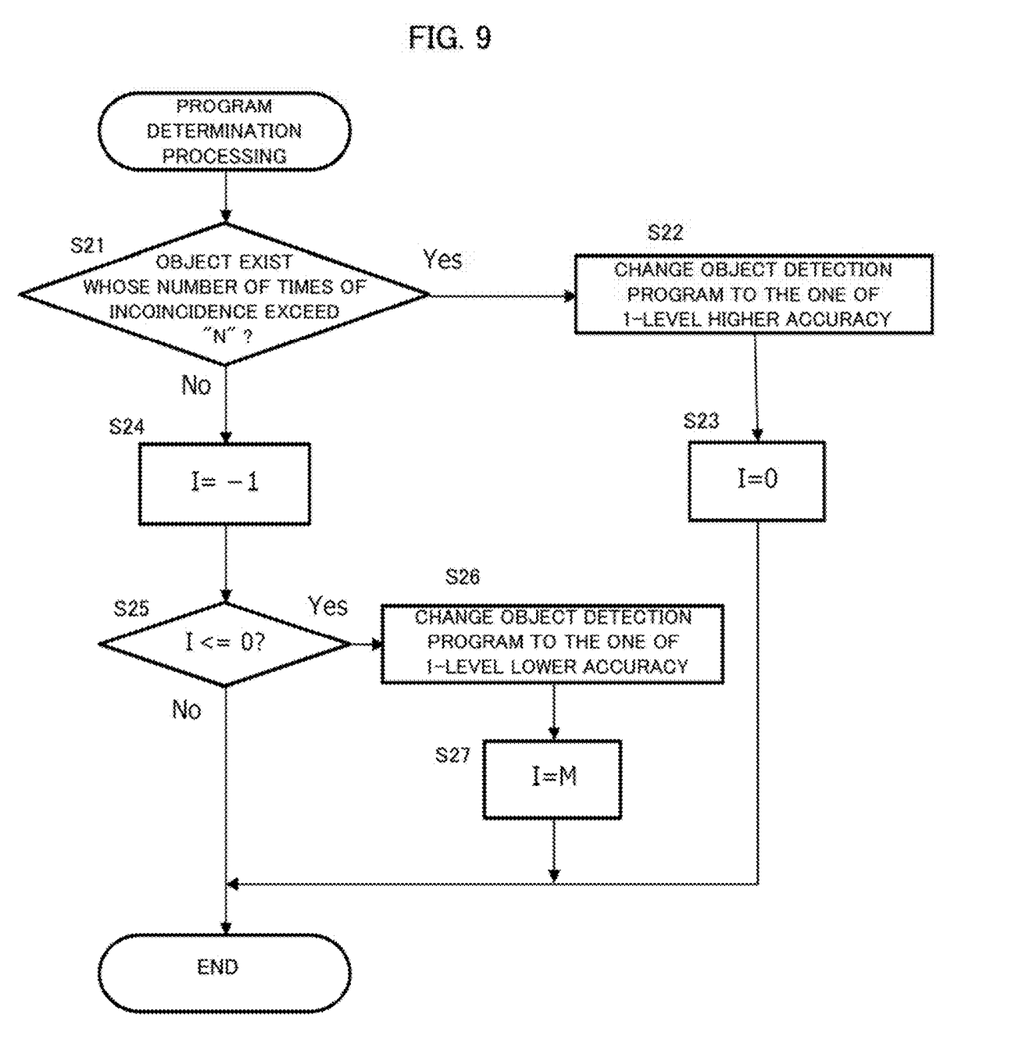
FIG. 9 is a flowchart of a first example of the program determination processing.

First, a description will be given of a first example of the program determination processing. FIG. 8 is a flowchart of an initialization processing of the program determination processing. FIG. 9 is a flowchart of a first example of the program determination processing. The processing is basically executed by the control unit 50, more specifically, the program determination unit 52 in the control unit 50.

First, the control unit 50 executes the initialization processing shown in FIG. 8. The control unit 50 sets the object detection program to be used to the default one (step S11), and sets the control parameter "I" to the initial value "M" (step S12). Here, "M" represents an arbitrary integer. The initial value M is used to determine whether or not to change the object detection program to the one of one-level lower accuracy. Then, the initialization processing ends.

Next, the control unit 50 executes the program determination processing shown in FIG. 9. When receiving the determination request of the object detection program from the object detection unit 20 in step S2 of FIG. 7, the control unit 50 refers to the tracking information stored in the tracking information storage unit 53, and determines whether or not there is an object whose number of times of incoincidence exceeds a predetermined value "N" (step S21). Here, the predetermined value N indicates the number of times of incoincidence required to change the object detection program to the one of higher accuracy. For example, if the predetermined value N is set to "0", the control unit 50 changes the object detection program to the one of higher accuracy when the predicted position and the detected position in one frame image in the video data become incoincident. If the predetermined value N is set to "1", the control unit 50 changes the object detection program to the one of higher accuracy when the predicted position and the detected position in two frame images in the video data become incoincident. Therefore, as the predetermined value N is set to a small value, the object detection program is changed with a small number of times of incoincidence.

When there is an object whose number of times of incoincidence exceeds the predetermined value N (step S21:Yes), the control unit 50 changes the object detection program to the one of one-level higher accuracy (step S22), and sets the control parameter I to "0" (step S23). Then, the control unit 50 ends the processing.

On the other hand, when there is no object whose number of times of incoincidence exceeds the predetermined value N (step S21:No), it is considered that the object tracking unit 30 is correctly detecting the object, and the control unit 50 subtracts "1" from the control parameter I (step S24). Next, the control unit 50 determines whether the control parameter I is equal to or less than 0 (step S25). When the control parameter I is equal to or less than "0" (step S25:Yes), the control unit 50 changes the object detection program to the one of one-level lower accuracy (step S26). Namely, when the number of times that the detected position and the predicted position of the object are not incoincident exceeds the initial value M, the control unit 50 changes the object detection program to the one of one-level lower accuracy. Then, the control unit 50 sets the control parameter I to the initial value M (step S27), and ends the processing.

On the other hand, when the control parameter I is not equal to or less than "0" in step S25 (step S25:No), the control unit 50 ends the processing without changing the object detection program. Namely, the control unit 50 uses the current object detection program as it is. Then, the control unit 50 instructs the object detection unit 20 to use the object detection program determined by the program determination processing.

As described above, in the program determination processing, when the number of times that the detected position of the object by the object detection unit 20 and the predicted position of the object become incoincident exceeds the predetermined value N, the control unit 50 changes the object detection program to the one of one-level higher accuracy. On the other hand, when the number of times that the detected position and the predicted position of the object do not become incoincident exceeds the initial value M, the control unit 50 changes the object detection program to the one of one-level lower accuracy. Thus, the control unit 50 increases the accuracy of the object detection program when the object detection program in use causes the undetected state, and decreases the accuracy of the object detection program when the undetected state does not occur for a predetermined period. This makes it possible to improve the processing speed, while preventing the undetected state.

(2) Second Example

Next, a second example of the program determination processing will be described. In the first embodiment, the control unit 50 changes the object detection program to the one of one-level higher accuracy when there is an object in which the number of times of incoincidence between the detected position and the predicted position of the object exceeds the predetermined value N. However, according to the first example, even when the object disappears from the frame image of the video data, the detected position and the predicted position of the object become incoincident, and the object detection program is changed to the one of one-level higher accuracy. As a result, the processing speed may be unnecessarily lowered due to the use of the high-accuracy object detection program.

Therefore, in the second example, when there is an object for which the number of times of incoincidence between the detected position and the predicted position of the object exceeds the predetermined value N, the control unit 50 further determines whether or not the object is likely to disappear from the frame image. Specifically, the control unit 50 determines whether the predicted position of the object is included in a tracking target area T in the frame image. Here, the "tracking target area T" is fixedly set in advance with respect to the frame image, and preferably set at the center area of the frame image. If the predicted position of the object is not included in the tracking target area T, i.e., the predicted position of the object is present at the edge of the frame image, that object is likely to disappear from the frame image. Therefore, the control unit 50 does not change the object detection program to the one of high-accuracy, and continues to detect the object by the object detection program of low accuracy. Thus, by setting the area to be tracked as the tracking target area T, when the predicted position of the object is included in the tracking target area T, it is possible to increase the tracking accuracy by the high-accuracy object detection program. Further, when the predicted position of the object is not included in the tracking object area T, the processing speed can be increased by the object detection program of low accuracy with light processing load.

Figure 10:
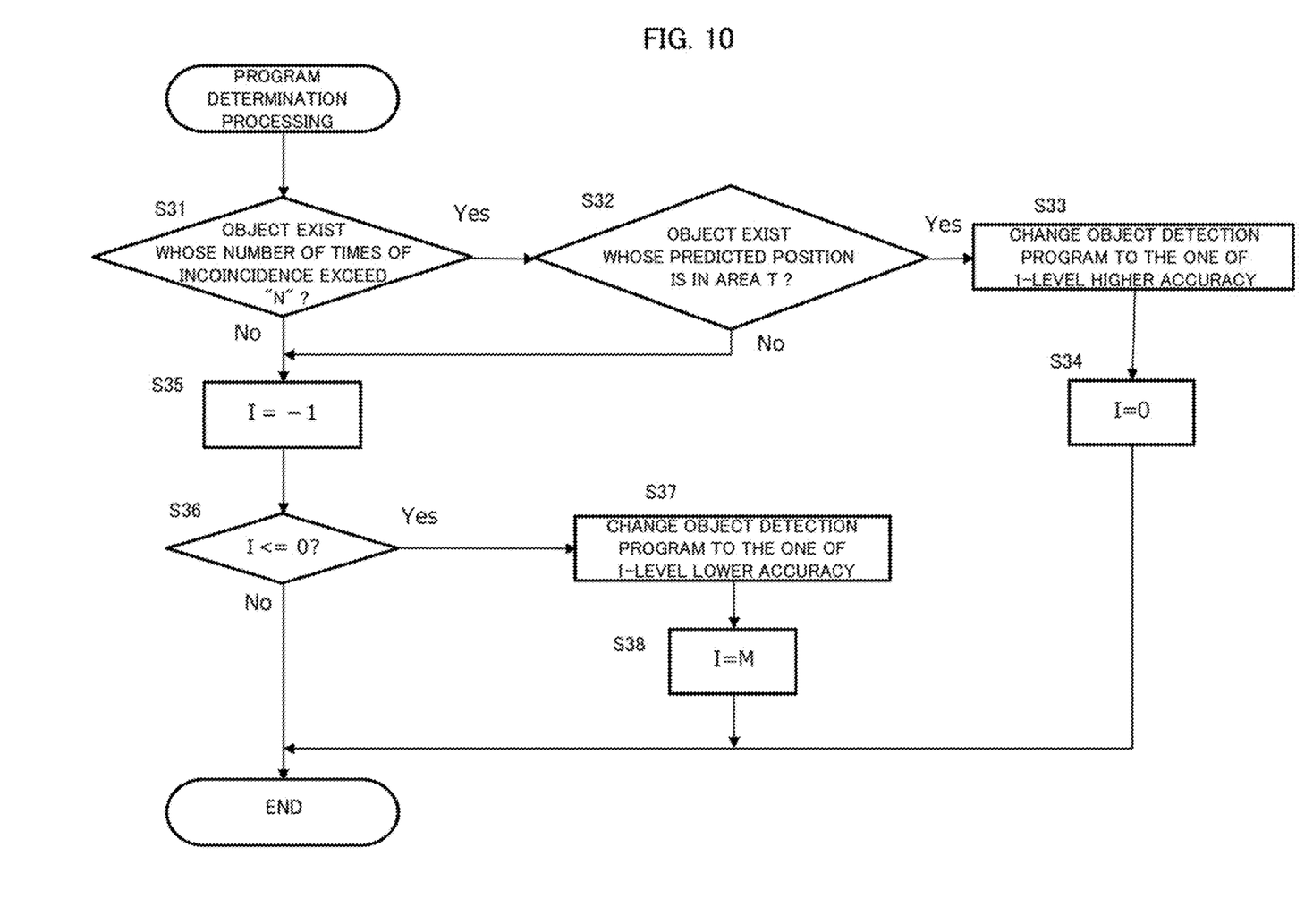
FIG. 10 is a flowchart of a second example of the program determination processing.

FIG. 10 is a flowchart of a second example of the program determination processing. This processing is also basically executed by the control unit 50. Also in the second example, the initialization processing shown in FIG. 8 is executed first. Thereafter, when receiving the determination request of the program from the object detection unit 20 in step S2 of FIG. 7, the control unit 50 refers to the tracking information stored in the tracking information storage unit 53, and determines whether or not there is an object whose number of times of incoincidence exceeds a predetermined value "N" (step S31). If there is no object whose number of times of incoincidence exceeds the predetermined value N (step S31:No), the processing proceeds to step S35.

On the other hand, when there is an object whose number of times of incoincidence exceeds the predetermined value N (step S31:Yes), the control unit 50 determines whether or not there is an object whose predicted position obtained by the object tracking unit 30 is included in the tracking target area T set in the frame image (step S32). If there is an object whose predicted position is included in the tracking target area T (step S32:Yes), the control unit 50 changes the object detection program to the one of one-level higher accuracy (step S33). Then, the control unit 50 sets the control parameter I to "0" (step S34), and ends the processing.

On the other hand, when there is no object whose predicted position is included in the tracking target area T (step S32:No), the control unit 50 does not change the object detection program and proceeds to step S35. Since steps S35 to S38 in the second example are the same as steps S24 to S27 in the first example, and description thereof is omitted. Thus, in the second example, the use of the high-accuracy object detection program is controlled not to be unnecessarily frequent, thereby preventing the processing speed from being lowered.

Second Example Embodiment

Figure 11:
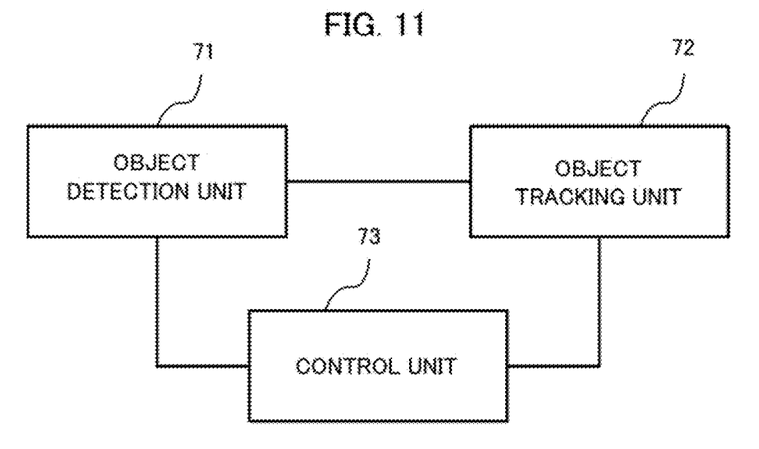
FIG. 11 is a block diagram showing a functional configuration of the object tracking device according to a second example embodiment.

FIG. 11 shows a functional configuration of an object tracking device according to a second example embodiment of the present invention. As shown, the object tracking device includes an object detection unit 71, an object tracking unit 72, and a control unit 73. The object detection unit 71 detects an object from video data using a plurality of object detection programs of different detection accuracy. The video data includes an object to be tracked, and for example, a group of frame images arranged in time series.

The object tracking unit 72 tracks the object from the detected position of the object by the object detection unit 71. For example, the object tracking unit 72 calculates the predicted position of the object from the past detected positions, and determines whether or not the detected position of the object coincides with the predicted position. The control unit 73 controls the object detection program used by the object detection unit 71 based on the detection result of the object by the object detection unit 71 and the tracking result of the object by the object tracking unit 72. Specifically, when the object detection unit 71 cannot detect the object even though the object tracking unit 72 is correctly tracking the object and the object should exist in the frame image, the control unit 73 controls the object detection program used by the object detection unit 71 such that the object is detected.

A part or all of the example embodiments described above may also be described as the following supplementary notes, but not limited thereto.

(Supplementary Note 1)

An object tracking device comprising:

an object detection unit configured to detect an object from video data using a plurality of object detection programs of different detection accuracy;

an object tracking unit configured to track the object from a detected position of the object; and a control unit configured to control the object detection programs used by the object detection unit, based on a detection result of the object by the object detection unit and a tracking result of the object by the object tracking unit.

(Supplementary Note 2)

The object tracking device according to supplementary note 1, wherein the control unit changes the object detection program used by the object detection unit when the object detection unit cannot detect the object at a predicted position of the object generated by the object tracking unit.

(Supplementary Note 3)

The object tracking device according to supplementary note 1, wherein the control unit changes the object detection program used by the object detection unit when the object detection unit cannot detect the object at a predicted position of the object generated by the object tracking unit and the predicted position is included in a predetermined area in the video data.

(Supplementary Note 4)

The object tracking device according to supplementary note 2, wherein the control unit determines that the object detection unit cannot detect the object when the object detection unit cannot detect the object more than a predetermined number of times.

(Supplementary Note 5)

The object tracking device according to supplementary note 2, wherein the control unit determines that the object detection unit cannot detect the object when the detected position of the object detected by the object detection unit and the predicted position of the object generated by the object tracking unit do not coincide.

(Supplementary Note 6)

The object tracking device according to supplementary note 2, wherein the control unit changes the object detection program used by the object detection unit to the object detection program of one-level higher accuracy.

(Supplementary Note 7)

The object tracking device according to supplementary note 2, wherein the control unit changes the object detection program used by the object detection unit to the object detection program of one-level lower accuracy when the object detection unit can detect the object more than a predetermined number of times at the predicted position of the object generated by the object tracking unit.

(Supplementary Note 8)

An object tracking method executed by an object tracking device, comprising:

detecting an object from video data using a plurality of object detection programs of different detection accuracy;

tracking the object from a detected position of the object; and controlling the object detection programs used to detect the object, based on a detection result of the object and a tracking result of the object.

(Supplementary Note 9)

A recording medium recording a program, the program causing a computer to function as:

an object detection unit configured to detect an object from video data using a plurality of object detection programs of different detection accuracy;

an object tracking unit configured to track the object from a detected position of the object; and a control unit configured to control the object detection programs used by the object detection unit, based on a detection result of the object by the object detection unit and a tracking result of the object by the object tracking unit.

While the present invention has been described with reference to the embodiments, the present invention is not limited to the above example embodiments. Various changes that can be understood by those skilled in the art within the scope of the present invention can be made in the configuration and details of the present invention. In other words, it is needless to say that the present invention includes various modifications and alterations that could be made by a person skilled in the art according to the entire disclosure, including the scope of the claims, and the technical philosophy. In addition, each disclosure of the above-mentioned patent documents cited shall be incorporated with reference to this document.

This application is based upon and claims the benefit of priority from Japanese Patent Application 2019-45641, filed on Mar. 13, 2019, the disclosure of which is incorporated herein in its entirety by reference.

DESCRIPTION OF SYMBOLS

1 Object tracking device
3 Processor
4 Memory
7 Video source
8 Recording medium
10 Video data acquisition unit
20 Object detection unit
30 Object tracking unit
40 Output unit
50 Control unit

What is claimed is:

1. An object tracking device comprising:
a memory storing instructions; and
a processor configured to execute the instructions to:
detect an object from video data using a currently selected object detection program of a plurality of object detection programs that are used to detect the object but that are of different detection accuracy;
generate a predicted position of the object from a detected position of the object and track the object using the predicted position;
control the currently selected object detection program, based on a detection result of the object and a tracking result of the object;
when the object is no longer detected at the predicted position, select a different object detection program of the plurality of object detection programs to instead use to detect the object; and when the object has been detected at the predicted position more than a predetermined number of times, select a most accurate object detection program of those of the plurality of object detection programs that have lower accuracy than the currently selected object detection program, to instead use to detect the object.

2. The object tracking device according to claim 1, wherein the processor is configured to execute the instructions to select the different object detection program when the object is no longer detected at the predicted position and the predicted position is within a predetermined area in the video data.

3. The object tracking device according to claim 1, wherein the processor is configured to select the different object detection program when the object is no longer detected at the predicted position more than a predetermined number of times.

4. The object tracking device according to claim 1, wherein the processor is configured to select the different object detection program when the detected position of the object and the predicted position of the object do not coincide.

5. The object tracking device according to claim 1, wherein the processor is configured to select the different object detection program as a least accurate object detection object of those of the plurality of object detection programs that have higher accuracy than the currently selected object detection program.

6. An object tracking method executed by an object tracking device and comprising:
 detecting an object from video data using a currently selected object detection program of a plurality of object detection programs that are used to detect the object but that are of different detection accuracy;
 generating a predicted position of the object from a detected position of the object and track the object using the predicted position;
 controlling the currently selected object detection program, based on a detection result of the object and a tracking result of the object;
 when the object is no longer detected at the predicted position, selecting a different object detection program of the plurality of object detection programs to instead use to detect the object; and
 when the object has been detected at the predicted position more than a predetermined number of times, selecting a most accurate object detection program of those of the plurality of object detection programs that have lower accuracy than the currently selected object detection program, to instead use to detect the object.

7. A non-transitory computer-readable recording medium storing a program executable by a computer to:
 detect an object from video data using a currently selected object detection program of a plurality of object detection programs that are used to detect the object but that are of different detection accuracy;
 generate a predicted position of the object from a detected position of the object and track the object using the predicted position;
 control the currently selected object detection program, based on a detection result of the object and a tracking result of the object;
 when the object is no longer detected at the predicted position, select a different object detection program of the plurality of object detection programs to instead use to detect the object; and
 when the object has been detected at the predicted position more than a predetermined number of times, select a most accurate object detection program of those of the plurality of object detection programs that have lower accuracy than the currently selected object detection program, to instead use to detect the object.

\* \* \* \* \*